United States Patent
Koch (10) Patent No.: US 7,347,765 B2
(45) Date of Patent: Mar. 25, 2008

(54) HONING INSTALLATION WITH SEVERAL WORK STATIONS

(75) Inventor: Willi Koch, Nuertingen (DE)

(73) Assignee: Nagel Maschinen- und Werkzeugfabrik GmbH, Nuertingen (DE)

( * ) Notice: Subject to any disclaimer, the term of this patent is extended or adjusted under 35 U.S.C. 154(b) by 90 days.

(21) Appl. No.: 11/253,258

(22) Filed: Oct. 17, 2005

(65) Prior Publication Data

US 2006/0089087 A1    Apr. 27, 2006

(30) Foreign Application Priority Data

Oct. 27, 2004    (DE)    ............ 10 2004 053 503

(51) Int. Cl.
*B24B 49/00* (2006.01)
(52) U.S. Cl. .............. 451/9; 451/10; 451/11; 451/57; 451/180; 451/184; 451/336
(58) Field of Classification Search .......... 451/9, 451/10, 11, 27, 51, 52, 57, 180, 184, 336, 451/901

See application file for complete search history.

(56) References Cited

U.S. PATENT DOCUMENTS

| | | | | |
|---|---|---|---|---|
| 3,543,392 A | * | 12/1970 | Bomkamp et al. ............ 29/563 |
| 3,633,322 A | * | 1/1972 | Morcom ..................... 451/54 |
| 3,992,822 A | * | 11/1976 | Faubel et al. ............... 451/401 |
| 4,237,598 A | * | 12/1980 | Williamson ................... 483/4 |
| 4,760,671 A | * | 8/1988 | Ward .......................... 451/333 |
| 6,357,994 B1 | * | 3/2002 | St. Onge .................... 414/738 |
| 6,752,691 B1 | * | 6/2004 | Jakoby et al. ................ 451/6 |
| 7,086,518 B1 | * | 8/2006 | Hranica et al. ......... 198/341.03 |

FOREIGN PATENT DOCUMENTS

DE    199 48 139 A1    4/2001

* cited by examiner

*Primary Examiner*—Eileen P. Morgan
(74) *Attorney, Agent, or Firm*—Akerman Senterfitt (57) ABSTRACT

A honing installation for honing workpieces comprises a plurality of work stations, each work station being configured for performing at least one working step on a workpiece and at least part of the work station is set up as a honing station for performing at least one honing operation on a workpiece. The honing installation also comprises a conveyor system for conveying workpieces to and from work stations. There is also a control device for controlling the honing installation. Each of the work stations is directly connected to the conveyor system. This configuration allows a flexible control of the honing process.

40 Claims, 3 Drawing Sheets

HONING INSTALLATION WITH SEVERAL WORK STATIONS

The following disclosure is based on German Patent Application No. 10 2004 053 503.5 filed on Oct. 27, 2004, which is herewith incorporated into this application by explicit reference.

BACKGROUND OF THE INVENTION

1. Field of the Invention

The invention relates to a honing installation for the honing of workpieces.

2. Description of the Related Art

Honing is a machining or cutting process with geometrically undefined cutting edges. The multiple cutting edge honing tools perform a cutting movement comprising two components. As a result the machine surface has defined crossed traces of the cutting movement. The different method variants determine the surface structure attainable by honing. Honing makes it possible to produce finished surfaces satisfying extremely high demands with regards to the dimensional and shape tolerances, as well as the surface structure. Thus, e.g. during engine manufacture cylinder working surfaces (inner surfaces of cylinder bores or liners) and bearing surfaces for shafts undergo honing. During the machining of cylinder working surfaces typically several different, successive honing operations are performed, e.g. rough honing or prehoning for producing the necessary basic shape and finish-honing for producing the ultimately required surface structure. The success of the machining can be checked by subsequent measurement steps.

In the mass production of engine blocks and other workpieces to be machined by honing frequently multistage honing machines are used, which e.g. comprise a rough honing unit and a finish-honing unit, a rough honed workpiece being transferable within the honing machine in a direct manner to the finish-honing unit. Equipment for further processes, such as measuring and deburring, can be integrated into such a honing machine. To increase production capacity a honing installation can contain several work stations in the form of such honing machines in an arrangement linked with the aid of a conveying system.

If it is intended to machine workpieces of different sizes and shapes, a honing machine has to be retooled for the particular workpiece type, which generally requires a replacement of the corresponding honing tools and/or a reconfiguration of the control. By modular construction of honing machines attempts are made to minimize the necessary retooling times in order to improve the economics of the honing process. However, the honing machine is unavailable for the period of retooling or also for any necessary repair. In the case of the normal linking of several honing machines to a transfer line, the latter is "stationary" if a work station temporarily fails due to retooling or repair.

SUMMARY OF THE INVENTION

It is one object of the invention to provide a honing installation for the honing of workpieces, which is characterized by high availability of its machining capacity. It is another object to provide a honing installation which is flexibly adaptable to different machining tasks.

To address these and other objects the invention, according to one formulation of the invention, provides a honing installation comprising:

a plurality of work stations, each work station being configured for performing at least one working step on a workpiece and at least part of the work stations is set up as a honing station for performing at least one honing operation on a workpiece;

a conveyor system for conveying workpieces to and from the work stations; and a control device for controlling the honing installation;

wherein each of the work stations is directly connected to the conveyor system.

Advantageous further developments appear in the dependent claims. By express reference the wording of all the claims is made into part of the description.

As a result of this configuration it is possible for the conveying system to serve each of the work stations independently of processes taking place on other work stations, in order either to be equipped with a workpiece to be machined or for conveying away a machined workpiece. Thus, each work station can be directly served by the conveying system without it being necessary to supply or remove a workpiece via another work station. As a function of the availability of the individual work stations, the control device assumes responsibility for the distribution of the workpieces and consequently controls the work flow through the honing installation. If a work station fails due to a planned conversion or a planned or unplanned maintenance or repair, the honing installation can continue to operate without interruption with the aid of the other work stations, in that the conveying system guides the material flow past the work station which has temporarily failed. This ensures that if one work station fails there is no need to have any significant interruption to the production process. In the least favorable case a temporary failure of a work station can lead to a temporary slight slowing down of the overall production process, but the latter does not have to be interrupted. This ensures a substantially uninterrupted honing installation availability.

The control device can be organized in a centralized or decentralized manner. In one variant each work station has its own control unit containing the functionality necessary for the function of the work station. Therefore said control unit can incorporate the "intelligence" of the working step or the working step combination for which said work station is provided. Such work stations can function in anarchic manner. A separate control unit can be provided for the conveying system for controlling the interplay of the components of the conveying system and therefore the conveying of parts. With said control units for the work station and conveying system can be associated a master control unit, which can e.g. monitor the state of the individual work stations, control the parts transfer during the transition between conveying system and work station or vice versa and optionally to a limited extent can initiate or trigger activities at the individual work stations. Such a configuration can be referred to as a decentralized control coordinated by means of the master control unit. There can be line-connected or line-free data transmission connections between the individual control units. It is also possible to provide a single, central control unit, which controls the conveying of parts of the conveying system, the functions of the individual work stations and the processes at the intermediate interfaces. The configuration of the overall control can be designed in optimized manner with a view to the desired function of the complete honing installation.

It is possible for a given work station to be designed as a specialized work station set up solely for a specific working step (e.g. rough honing, finish-honing or measuring). As a rule all the work stations of the honing installation are specialized in this way. Thus, the work stations can be simply and robustly constructed and therefore inexpensive. Use can be made of relatively small, specialized work stations, e.g. one or more work stations exclusively set up for rough honing and one or more other work stations exclusively set up for finish-honing. The complete honing of a bore, including rough honing, optionally intermediate honing and finish-honing can be distributed over several separate work stations, which are successively traversed by the workpiece and the conveying system is responsible for the transfer between the work stations. The control of the loading and unloading of the individual work stations can be coordinated by means of the control unit. Installations of this type can be used with a high degree of flexibility.

Generally a work station can be designed for one or more working steps. Thus, it is also possible to perform more complex machining processes at a work station. It is e.g. possible that at one work station a honing step and a measuring step are performed prior to the workpiece being forwarded by the conveying system to the next work station. It is also possible for at least one work station to be set up for honing and deburring or for deburring and checking or for honing, deburring and checking or for honing and brushing or for some other combination of two or more different working steps.

In one embodiment the number of work stations exceeds the number of working steps in a machining process. As a result at least one work station can be kept "in reserve" for the case of the failure of another work station and the material flow can be passed through the reserve work station. Obviously the work station serving as the "reserve" can also be incorporated into the normal machining process, so that e.g. temporarily at least two work stations are simultaneously available for a particular working step.

In an embodiment for each work station configured for a specific working step, at least one further work station is provided and is configured for the same working step. This ensures that in the case of a temporary failure of a work station the material flow can be passed via the associated, further work station already configured for the intended working step and which without prior retooling can serve as a temporary spare or substitute for the failed work station. If both the specific work station and the associated further work station are available, this makes it possible to increase e.g. at least double the machining capacity for the particular working step. This "spare principle" can be correspondingly used for other work stations designed for more than one working step.

It has generally proved favorable if the number of work stations is an integral multiple of the number of working steps in a machining process. Thus, e.g. one honing installation can have two "pairs" of mutually associated rough honing work stations and only a single "pair" for the subsequent finish-honing. The in each case associated, identically configured work stations of a work station pair can function as spares for one another and can operate in parallel when operation is not disturbed. Thus, the honing installation can be optimized in flexible manner for optimum passage times. If e.g. the machining process is designed in such a way that more time is required for rough honing on a workpiece than for the subsequent finish-honing, the honing installation can have more work stations for the rough honing operation than for the finish-honing, so that despite the longer machining time during rough honing a timing of the installation can be brought about which corresponds to the time period required for the shortest of the working steps of the machining process. In other words the machining capacity of the honing installation for specific working steps can be optimized as a function of the machining time required for the particular working step.

In one embodiment the conveying system is optimized for a flexible control of all the work stations of the honing installation. For this purpose in a preferred embodiment of a conveying system there is at least one main conveying section and a plurality of secondary conveying sections, a main conveying section being configured for the transfer of workpieces between a transfer station of the honing installation and a secondary conveying section and a secondary conveying section can be configured for the transfer of workpieces between the main conveying section and at least one work station. As a result of the transfer of the workpieces between the main conveying section and the secondary conveying section a particularly flexible distribution of the workpieces over the work stations is possible. As soon as a workpiece has been taken over by a secondary conveying section, the main conveying section is so controlled independently of the secondary conveying section that an optimum transfer of workpieces to other secondary conveying sections is ensured. The coordination of the main conveying section and the secondary conveying sections is taken over by the central control device of the honing installation.

In another embodiment the conveying system has at least two, parallel operable main conveying sections and a plurality of secondary conveying sections, each secondary conveying section being configured for the transfer of workpieces between each of the main conveying sections and at least one work station. This creates further flexibility and provides additional certainty that even if a main conveying section fails the operation of the installation and the material flow via the at least one further main conveying sections can be maintained. Although more than two main conveying sections can be provided, in a preferred embodiment there are precisely two main conveying sections, which can e.g. be designed as parallel, more particularly linearly directed longitudinal conveyors. The secondary conveying sections can be designed as transverse conveyors, which starting from a main conveying section or several main conveying sections serve work stations located on either side of the main conveying section or sections. In one embodiment a secondary conveying section is associated with two work stations which can be configured for the same working step. With the aid of the secondary conveying section, as desired, one or other of said work stations can be served.

In a further development at least one of the work stations is designed as a work centre, which comprises a transfer unit and a working unit and the transfer unit is configured for transferring workpieces between the conveying system and the work unit. Preferably all the work stations are designed as such work centres. This increases the flexibility of the installation and improves the speed of transfer of workpieces between the conveying system and the working units used for the handling of the workpieces in the work stations. A transfer unit is preferably constructed as a circular table, which is in particular rotatable in a limited or unlimited manner about an axis which is vertically aligned in operation. Alternatively a transfer unit can e.g. be constructed as a Carree conveyor. Preferably the transfer unit also comprises a lifting unit, so that the workpiece can be correctly vertically positioned with the aid of the transfer unit both during the transfer to the working unit and during the transfer to the conveying system. Lifting circular tables are particularly preferred as transfer units.

To increase flexibility individual or all the work stations can be equipped with a working means changer. Thus, a honing station can e.g. comprise a tool changer, which preferably is controlled by means of the central control unit and which can receive different honing tools, so that e.g. on changing workpiece types the honing station can be rapidly retooled to a different honing operation. In a measuring station the working means changer can be a measuring means changer, in order to temporarily keep available different measuring probes for different testing functions.

In an embodiment at least one work station is configured as a rough honing station and preferably there is an even number of rough honing stations. Preferably at least one work station is configured as a finish-honing station and an even number of finish-honing stations can be favorable. Preferably, in addition to the honing stations, there is at least one measuring station in order to be able to monitor the work result of the preceding working steps. There is preferably an even number of measuring stations.

These and further features can be gathered from the claims, description and drawings and the individual features, both singly and in the form of sub combinations, can be implemented in an embodiment of the invention and in other fields and can represent an advantageous, independently protectable embodiment.

BRIEF DESCRIPTION OF THE DRAWINGS

Embodiments of the invention are described hereinafter relative to the drawings.

DETAILED DESCRIPTION OF THE PREFERRED EMBODIMENTS

Figure 1:
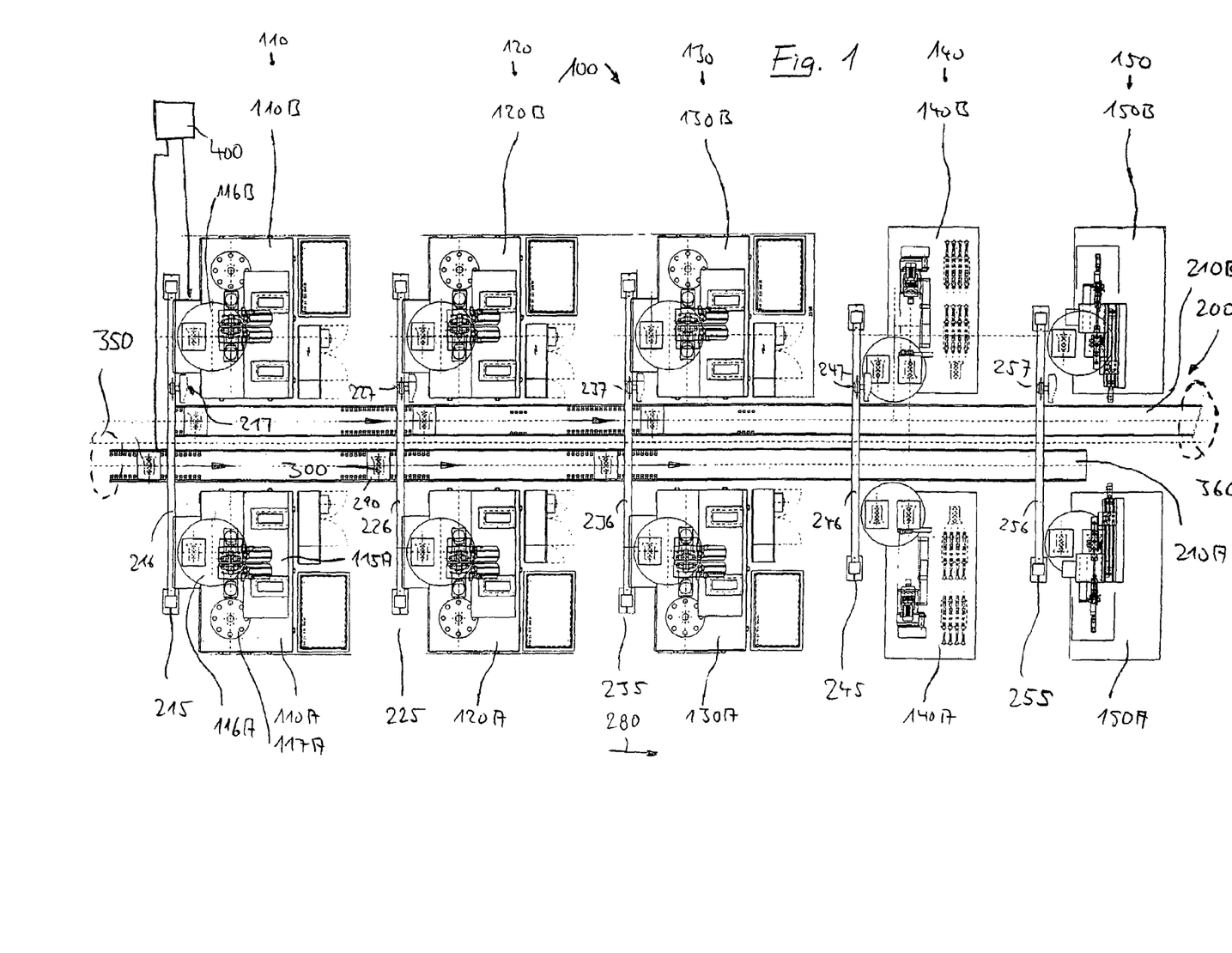
FIG. 1 ia a plan view of an embodiment of an inventive honing installation.

FIG. 1 shows in plan view an embodiment of an inventive honing installation 100, also referred to hereinafter as a honing or machining line. It is configured for the honing of workpieces in the form of engine blocks for internal combustion engines and makes it possible to machine by honing on said workpieces both the inner faces of cylinder bores and the inner faces of crankshaft bearing bores. It comprises ten work stations 110A, 110B, 120A, 120B, 130A, 130B, 140A, 140B, 150A, 150B, as well as a conveying system 200, which is designed for taking over workpieces 300 to be machined at an entrance-side transfer station 350, supply same in accordance with a variable sequence plan to individual work stations and to feed the machined workpieces to subsequent machining steps in the vicinity of an exit-side transit station 360. The entire honing installation is controlled and monitored in computer-assisted manner by a control device 400. The individual work stations and the conveying system have in each case specialized control units in data transmission connection with the control device and configured in such a way that they control processes at the work stations and/or conveying system.

The conveying system comprises two main conveying sections 210A, 210B in the form of linear, mutually parallel roller conveyors. Both roller conveyors are designed for conveying the individual workpieces in the same direction parallel to the main workpiece flow direction 280 between the region of the entrance-side transfer station and the region of the exit-side transit station. The installation of the embodiment shown is so configured that considered in the material flow direction the right-hand roller conveyor 210A is used for transporting in workpieces to the work stations and the juxtaposed roller conveyor 210B for conveying away the workpieces.

Transversely to the main conveyor sections 210A, 210B are provided at appropriate intervals secondary conveyor sections 215, 225, 235, 245, 255 in the form of loading gantries. Each loading gantry has a cross beam 216, 226, 236, 246, 256 running above the main conveyor sections and on which is arranged in a linear guide a gripper system 217, 227, 237, 247, 257. In the pallet conveyor system shown the individual workpieces are placed on pallets 290 and the gripper systems are set up for gripping the pallets, so as to transfer the workpiece either from one of the main conveyor sections 210A, 210B to one of the work stations, or from one of the work stations to one of the main conveyor sections, or from one of the main conveyor sections to the other main conveyor section.

The work stations are in each case set up homologously to one another pair wise to the left and right of the main conveyor sections 210A, 210B. In each case one secondary conveyor section serves two facing work stations in each case forming a work station pair 110, 120, 130, 140, 150. The work stations of a work station pair are configured for the same working step in each case. In the exemplified system the entrance-side work stations 110A, 110B are in each case set up as rough honing stations for the rough honing of cylinder bores. The same applies for the work stations 120A, 120B of the second work station pair 120. The following work station pair 130 in the main workpiece flow direction has two finish-honing stations 130A, 130B. They differ as regards their configuration from the rough honing stations 110A, 120A, 110B, 120B in that other honing tools are used and the control is configured for a finish-honing process. The honing stations 140A, 140B of the following work station pair 140 are in each case configured as honing devices for honing crankshaft bearing bores. The following work stations 150A, 150B are measuring stations with measuring devices permitting the measurement of the honed cylinder bores and honed crankshaft bearing bores.

All the work stations are constructed in the manner of work centres and in each case comprise a working unit for performing the particular working step (e.g. rough honing, finish-honing, measuring), and a transfer unit ensuring a transfer of the workpieces to be machined between the associated secondary conveyor sections of the conveyor system and the working units. In all the work stations the transfer units are designed as circular lifting tables 116A, 116B etc. and through a rotary movement about a vertical rotation axis effect the transfer between working unit and conveyor system and optionally through a vertical movement with the aid of a lifting unit perform a height adaptation.

In the embodiment shown the honing stations 110A, 120A, 130A on the one hand and 110B, 120B, 130B on the other arranged successively in the running direction on one side of the main conveyor section in each case have a mutually similar construction and the designs of the different sides only differ through the homologous arrangement of the corresponding components. The construction will be described in detail using the example of rough honing station 110A. The working unit 115A comprises two in each case two-spindle honing units equipped with honing tools, whereby during the honing of cylinder bores of a four-cylinder engine, cylinders 1 and 3 are machined by one honing unit and cylinders 2 and 4 by the other honing unit. With the aid of the associated circular lifting table 116A the workpiece is transferred between the working unit and the conveyor system. Besides the honing units there is a tool changer system 117A with a turret. With the aid of the automatic tool changer it is possible, as a function of the control signals of the control device 400, to replace the honing tools already on the honing units by other such tools. Such a replacement can e.g. take place when honing tools become worn. It is in particular also possible through the tool change (and optionally a reconfiguration of the control unit parts for the work station) to retool the honing station for workpieces having a different shape and/or size or to retool the honing station for other honing operations, in that it is e.g. retooled from a rough honing station to a finish-honing station through the replacement of the corresponding tools.

The honing installation can operate as follows. At the entrance-side transfer station 350 a not shown robot or some other mechanism can in spaced manner place successive individual pallets with tools on the continuously moving conveying in system 210A and are moved by the latter in the main workpiece flow direction 280. As initially it is necessary to rough hone the cylinder bores on the workpiece, the latter is firstly fed to a rough honing station. For this purpose the control 400 establishes which of the four rough honing stations 110A, 120A, 110B, 120B is at present unoccupied. If e.g. rough honing station 120A can take up the next workpiece, the secondary conveyor section 215 is controlled in such a way that the gripper system 217 grips the pallet with the workpiece and moves into the vicinity of the circular table 116A of the rough honing station 110A. After depositing the pallet on the circular table the latter is rotated by 180°, so that the workpiece is correctly positioned under the honing spindles of working unit 115A. Optionally, through a lifting or lowering movement the workpiece can be correctly vertically positioned. The rough honing operation is then performed in per se known manner. At the end of rough honing, by rotating the circular table by 180ø again, the workpiece is turned back into the gripping area of the gripping device 217 and engaged by the latter. The workpiece with the rough honed cylinder bores is then placed by the gripper device 217 on the conveying away section 210B, which moves the pallet with the workpiece into the vicinity of the secondary conveyor section 235 which serves the two finish-honing devices 130A, 130B. The pallet is then gripped by the gripping device of the transverse conveyor and is laterally moved to the particular honing station which is instantaneously free where, as in the manner described hereinbefore, the workpiece is brought into the vicinity of the honing units, finish-honed and then transferred back via the associated circular table to the transverse conveyor, which moves the workpiece with the finish-honed cylinder bores back to the conveying away section 210B and deposits same there. Correspondingly the pallet with the next workpiece is now moved to the next transverse conveyor 245 whose gripping device grips the pallet and moves it to one of the honing stations 140A, 140B, where honing is carried out on the crankshaft bearing bores of the engine block. At the end of this honing operation the now finish-honed workpiece is moved back onto the conveying away section 210B and displaced together with the pallet into the vicinity of the measuring stations 150. In the same way as described hereinbefore, the finish-honed workpiece is conveyed to the next free measuring station, where it is measured and then moved back to the conveying away system 210B, which conveys the finish-honed and finish-measured workpiece to the exit-side transit station 360.

Even this regular sequence makes clear the high flexibility of the installation. For each transverse conveyor 215, 225, 235, 245, 255 the installation has the possibility of performing the intended honing step or measuring step on one of the two work stations connected to the particular transverse conveyor. If e.g. one of the work stations has failed because maintenance work is being carried out thereon, this is detected by the control devices 400 and automatically the next workpiece is brought to the facing, other work station. As in the case of the rough honing stations it is even possible to select from among four rough honing stations, the flexibility is particularly great and the installation has a particularly high machining capacity for the rough honing step. This possibly most time-consuming working step can be carried out for up to four more workpieces simultaneously at different work stations without having a disadvantageous influence on the overall workpiece throughput. The installation can be operated continuously provided that for each of the working steps intended at least one work station is functioning and the conveyor system is working.

Figure 2:
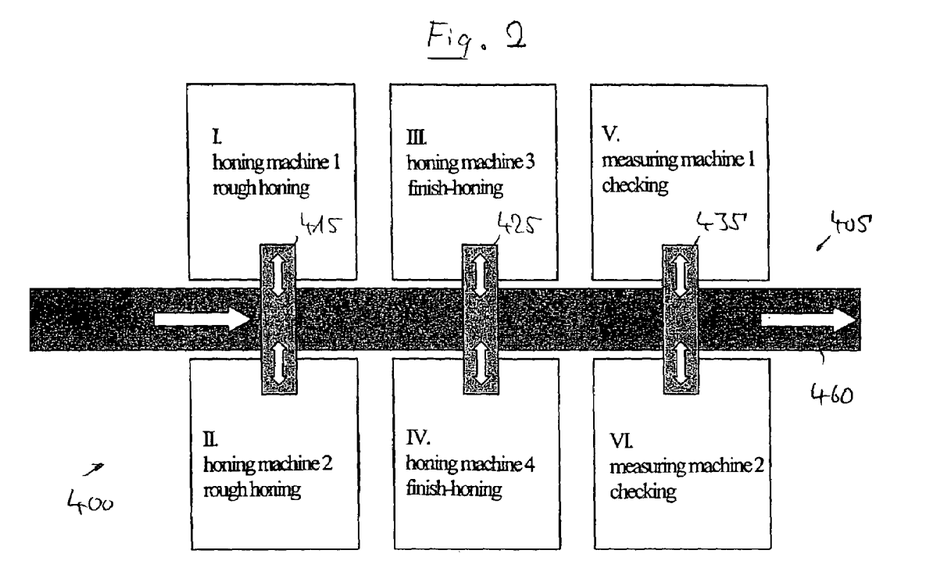
FIGS. 2 to 5 shows different configurations of honing installations and different variants for a workpiece flow through the honing installation according to embodiemnts of the invention.

FIGS. 2 to 5 diagrammatically illustrate a few other embodiments of inventive honing installations and possibilities for the use thereof. Honing installation 400 of FIG. 2 has a conveyor system 405 with a linear main conveyor section 460, whose main work flow direction is indicated by arrows, as well as three secondary conveyor sections 415, 435, 455, with which are in each case associated two work stations I, II, III, IV, V and VI located on different sides of the main conveyor section. The work stations located on facing sides of the main conveyor section and interconnected by means of a transverse conveyor are configured for the same machining step. The entrance-side work stations I and II are configured as rough honing stations, the middle work stations III and IV as finish-honing stations and the rear work stations V and VI as measuring stations. In order to be able to perform on each workpiece the intended sequence of rough honing—finish-honing—measuring, e.g. the following passages of parts through the honing installation are possible:

I III V: In this case the work stations located to the left of the main conveyor section are successively moved up to. On passing through the honing installation there can also be a change of sides e.g. according to the parts passage I IV V. Here between rough honing and finish-honing and finish-honing and checking there is a change of sides relative to the main conveyor section. There is a homologous path for the parts passage II III VI. There is a single change of sides e.g. for parts passage I IV VI. It is clear to the expert that these are only a few of the possible passage variants (permutations). However, the examples show that if one unit fails a second unit can take over this function, because for each function (rough honing, finish-honing, checking), there are in each case two facing work stations.

Figure 3:
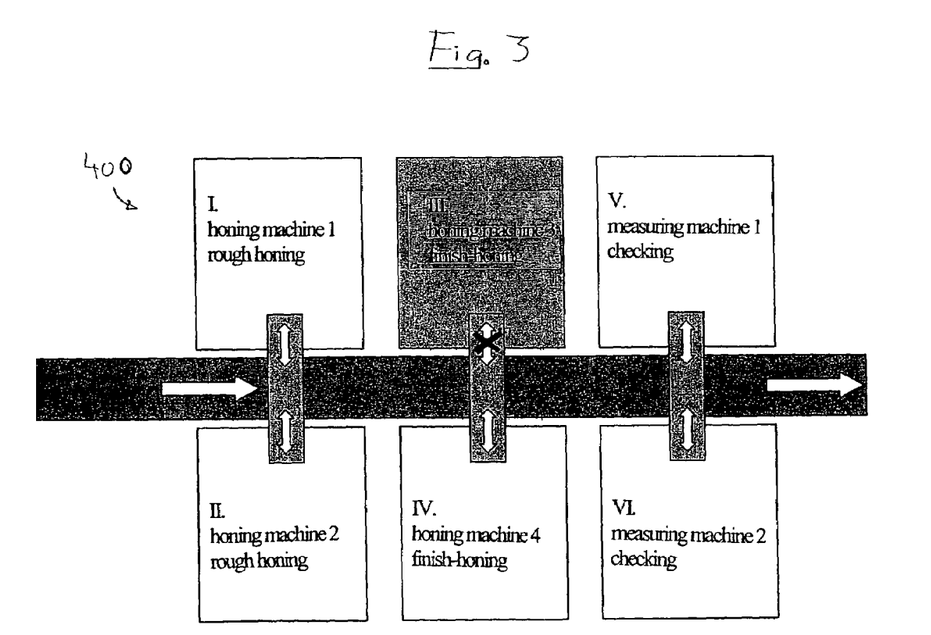

FIG. 3 illustrates possibilities for using the honing installation 400 with an only slightly reduced production capacity if one of the work stations has failed. In the case of FIG. 3 the finish-honing machine III to the left of the main conveyor section has failed. However, the following exemplified parts passages are still possible and in each case obviate the failed machine: I IV V or I IV VI or II IV V or II IV VI. If a machine fails the installation still has high flexibility, even if up to two further machines fail.

Figure 4:
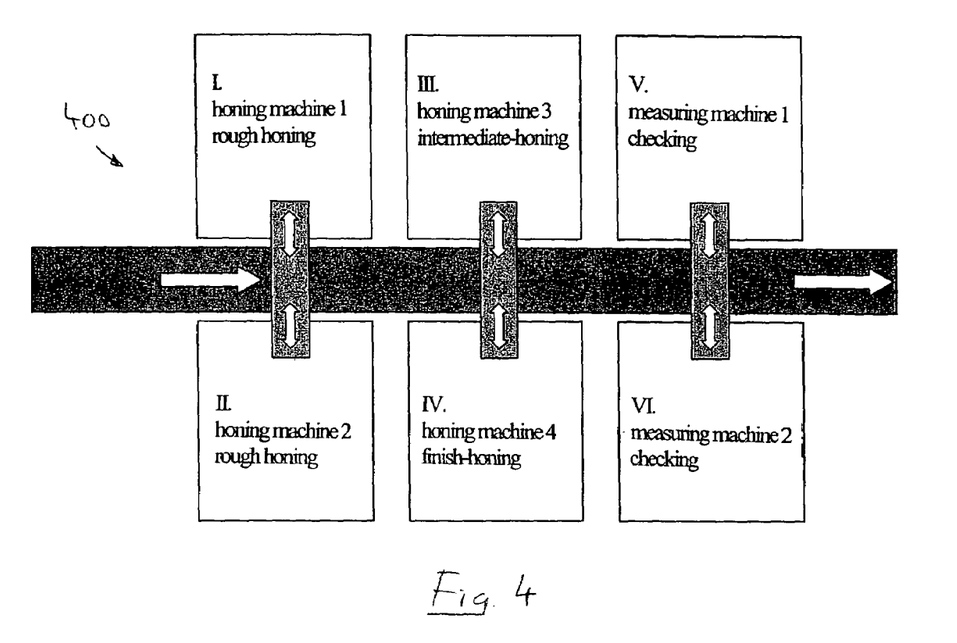

The introduction of new operations is automatically possible in this installation through a modification (e.g. reprogramming) of the existing installation. This reprogramming can be carried out in the central control unit, which is connected to the individual work stations and also influences the control programs there. In the case of FIG. 4, starting from the configuration of FIG. 2, the left-hand finish-honing machine (honing machine III) has been so reprogrammed that it is now configured for an intermediate honing step instead of for finish-honing and which differs both from rough honing and finish-honing. In this case and without further changes to the installation, a three-stage honing process, including a following measuring or checking process can be carried out. Through the introduction of a new operation without adding at least one further work station, it is possible to perform another machining process, but for a slightly reduced overall installation output. Hereinafter a few examples of possible parts passages are indicated by Roman numerals:

1. I III IV V,
2. I III IV VI,
3. II III IV V,
4. II III IV VI.

Due to the fact that in this installation honing stations III and IV are necessarily successively used and are only present once, said honing stations during each parts passage are successively moved up to in a fixed, pre-determined sequence. In this configuration the installation has increased susceptibility to machine failure. In the case of a failure of one of the honing machines III or IV, one of the machines I or II could take over the failed function.

Figure 5:
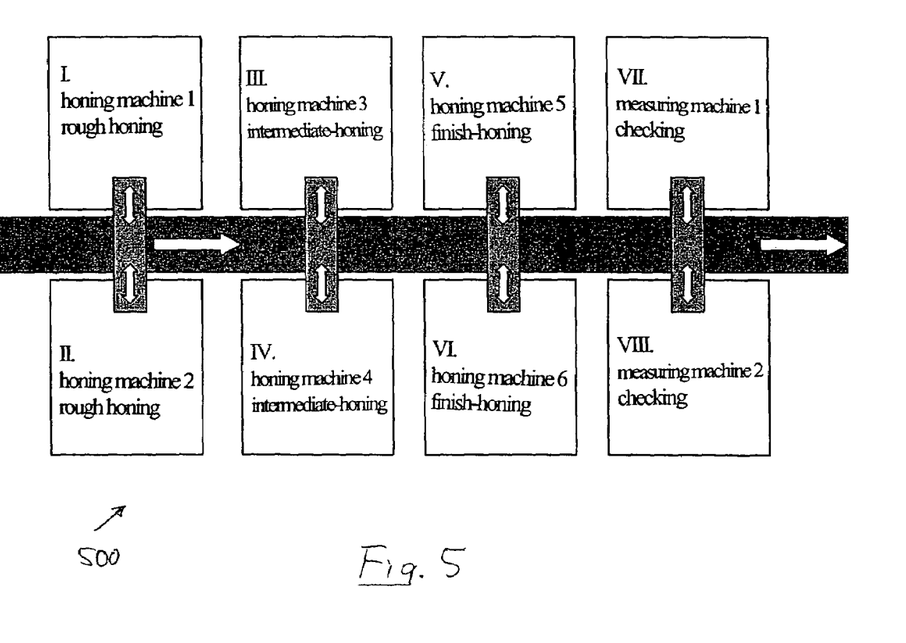

To maintain the capacity of the installation compared with the configuration of FIG. 2 and simultaneously integrate additional honing operations into the system, it is possible to extend an installation. An example of such a honing installation 500 is shown in FIG. 5. Here the entrance-side honing machines I and II are configured as rough honing machines, the following honing machines III and IV as intermediate honing machines, the next following honing machines V and VI as finish-honing machines and the last work stations VII and VIII as measuring stations. Hereinafter are given examples of possible parts passages using the known notations:

1. I III V VII,
2. I IV V VIII,
3. II III VI VII,
4. II III IV VIII,
5. etc.

These examples show that the honing units used and optionally also the measuring units can be standardized. Production and putting into operation of the individual, specialized units are greatly simplified as a result. Due to the flexible control and operation of the specialized work stations, within the scope of the invention it is possible to flexibly make available honing installations with a simple construction for very complex machining processes with numerous different machining steps. Simultaneously through the provision of several independently operable work stations for the same working step, the availability of the installation is increased and production reliability improved.

Honing installations are also possible where individual or all the work stations are set up for two or more working steps. The honing installation of FIG. 1 can e.g. also be configured in such a way that of the in all six work stations 110A, 11B, 120A, 120B, 130A, 130B provided for the honing processes in all three are designed as rough honing stations and the other three for two succeeding working steps, namely for intermediate honing and for plateau honing (finish honing). In a particular embodiment the honing stations 110A, 120A, 130A to the right of the main conveyor section are set up as rough honing stations, whereas the facing work stations 110B, 120B, 130B are set up for intermediate honing and finish-honing (e.g. plateau honing). At said work stations are consequently successively performed two different working steps before the workpiece is transferred back to the conveyor system. In such a configuration the workpiece is firstly conveyed by roller conveyor 210A to the right to the rough honing station and at the end of rough honing by means of the associated transverse conveyor to the facing intermediate and finish-honing station, before the finish-honed workpiece is brought by the transverse conveyor to the roller conveyor 210B and is conveyed away by the latter. A corresponding parts flow arises at the three succeeding pairs of facing honing stations.

For the installation size with six honing stations according to FIG. 1, it is also possible to configure two work stations for rough honing, two others for intermediate honing and two others for plateau honing. For example the facing honing stations can in each case be configured for the same working step.

As in conventional honing processes rough honing and intermediate honing constitute the most time consuming working steps, it can be advantageous for an optimum shortening of the transit time to provide more work stations for these working steps than for finish-honing and this is the case with the last-mentioned combinations. However, the honing installation can also be designed on the basis of other optimization criteria. For example, three of the work stations can in each case be designed as combination stations for rough honing and intermediate honing, whereas three other work stations, which succeed in the parts flow direction are designed solely for finish-honing. These few examples show that within the scope of the invention it is possible to construct honing installations which can be optimized with a view to the different work functions for each honing process.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A honing installation for the honing of workpieces comprising:

a plurality of work stations, each work station being configured for performing at least one working step on a workpiece wherein at least some of the work stations are set up as honing stations, the honing installation being configured for performing a multiple step honing operation on a workpiece, wherein a first work station is configured for performing a first working step of the multiple step honing operation and a second work station is configured for performing a second working step of the multiple step honing operation, wherein the first and second steps are different;

a conveyor system for conveying workpieces to and from the work stations; and a control device for controlling the honing installation, and for directing the workpieces to an available work station depending on the working step to be carried out on that workpiece, wherein each of the work stations is directly connected to the conveyor system.

2. Honing installation according to claim 1, wherein at least one work station is designed as a specialized work station set up solely for one specific working step.

3. Honing installation according to claim 1, wherein all the work stations of the honing installation are designed as specialized work stations each set up solely for one specific working step.

4. Honing installation according to claim 1, wherein at least one work station is set up for performing at least two working steps.

5. Honing installation according to claim 1, wherein the number of work stations exceeds the number of working steps provided in a machining process for a work piece worked by the honing installation.

6. Honing installation according to claim 1, wherein for each work station configured for a specific working step at least one further work station is provided which is configured for the same working step.

7. Honing installation according to claim 1, wherein the number of work stations is an integral multiple of the number of working steps provided in a machining process for a work piece worked by the honing installation.

8. Honing installation according to claim 1 wherein the first working step requires more time than the second working step, and wherein for the performance of the first working step more work stations are provided than for performing the second working step.

9. Honing installation according to claim 1 having several work station pairs of mutually associated work stations, wherein the work stations of a work station pair are configured for the same working step.

10. Honing installation according to claim 1, wherein the control device is configured in a decentralized manner, each work station and the conveyor system having its own control unit and the control units of the work stations and conveyor system being coordinated by a master control unit.

11. Honing installation according to claim 1, wherein the conveyor system has at least one main conveyor section and a plurality of secondary conveyor sections, a main conveyor section being configured for the transfer of workpieces between a honing installation transfer station and a secondary conveyor section and a secondary conveyor section is configured for the transfer of workpieces between the main conveyor section and at least one work station.

12. Honing installation according to claim 11, wherein the conveyor system has at least two parallel operable main conveyor sections and a plurality of secondary conveyor sections, each secondary conveyor section being configured for the transfer of workpieces between each of the main conveyor sections and at least one work station.

13. Honing installation according to claim 11, wherein there are precisely two main conveyor sections and where the secondary conveyor sections are designed as transverse conveyors which, starting from a main conveyor section or several main conveyor sections, serve work stations located on either side of the main conveyor section.

14. Honing installation according to claim 13, wherein the main conveyor sections are designed as parallel longitudinal conveyors.

15. Honing installation according to claim 11, wherein in each case two work stations are associated with a secondary conveyor section.

16. Honing installation according to claim 15, wherein the two work stations associated with a secondary conveyor section are configured for the same working step.

17. Honing installation according to claim 1, wherein at least one of the work stations is designed as a work centre, a work centre comprising a transfer unit and a working unit, wherein the transfer unit is configured for transferring workpieces between the conveyor system and the working unit.

18. Honing installation according to claim 14, wherein all the work stations are designed as a work centre.

19. Honing installation according to claim 18, wherein a transfer unit is constructed as a circular table rotatable about a rotation axis.

20. Honing installation according to claim 19, wherein the rotation axis is vertically oriented in operation.

21. Honing installation according to claim 17, wherein the transfer unit comprises a lifting unit for the vertical positioning of a workpiece with the aid of the transfer unit.

22. Honing installation according to claim 1, wherein at least one of the work stations is equipped with a working means changer for receiving several working means usable on the work unit.

23. Honing installation according to claim 1, wherein at least one work station is configured as a rough honing station for rough honing workpieces.

24. Honing installation according to claim 23, wherein there is an even number of rough honing stations.

25. Honing installation according to claim 1, wherein at least one of the work stations is configured as a finish-honing station.

26. Honing installation according to claim 25, wherein there is an even number of finish-honing stations.

27. Honing installation according to claim 1, wherein at least one of the work stations is configured as a measuring station.

28. Honing installation according to claim 27, wherein there is an even number of measuring stations.

29. Honing installation according to claim 1, wherein the workpiece must be worked on at least two work stations.

30. A honing installation for the honing of workpieces having:
    a plurality of work stations, each work station being configured for performing at least one working step on a workpiece wherein at least some of the work stations are set up as honing stations, the honing installation being configured for performing a multiple step honing operation on a workpiece,
    wherein a first work station is configured for performing a first working step of the multiple step honing operation and a second work station is configured for performing a second working step of the multiple step honing operation, wherein the first and second steps are different;
    a conveyor system for conveying workpieces to and from the work stations; and
    a control device for controlling the honing installation, and for directing the workpiece to an available work station depending on the working step to be carried out on that workpiece,
    wherein each of the work stations is designed as a work centre, a work centre comprising a transfer unit and a working unit, wherein the transfer unit is constructed as a circular transfer table rotatable about a vertical rotation axis for receiving workpieces thereon, and is configured for directly transferring workpieces between the conveyor system and the working unit.

31. Honing installation according to claim 30, wherein the transfer unit comprises a lifting unit for the vertical positioning of a workpiece with the aid of the transfer unit.

32. Honing installation according to claim 30, wherein at least one work station is configured as a rough honing station for rough honing workpieces and at least one of the work stations is configured as a finish-honing station for finish-honing workpieces previously rough honed on a rough honing station of the honing installation.

33. Honing installation according to claim 30, wherein the conveyor system has at least one main conveyor section and a plurality of secondary conveyor sections, a main conveyor section being configured for the transfer of workpieces between a honing installation transfer station and a secondary conveyor section and a secondary conveyor section is configured for the transfer of workpieces between the main conveyor section and at least one work station.

34. Honing installation according to claim 33, wherein the conveyor system has two parallel operable main conveyor sections and a plurality of secondary conveyor sections, each secondary conveyor section being configured for the transfer of workpieces between each of the main conveyor sections and at least one work station, where the secondary conveyor sections are designed as transverse conveyors which, starting from a main conveyor section or several main conveyor sections, serve work stations located on either side of the main conveyor section.

35. Honing installation according to claim 34, wherein there are precisely two main conveyor sections.

36. A honing installation for the honing of workpieces comprising:
a plurality of work stations, each work station being configured for performing at least one working step on a workpiece wherein at least some of the work stations are set up as honing stations, the honing installation being configured for performing a multiple step honing operation on a workpiece,
wherein a first work station is configured for performing a first working step of the multiple step honing operation and a second work station is configured for performing a second working step of the multiple step honing operation wherein the first and second working steps are different;
a conveyor system for conveying workpieces to and from the work stations, wherein the conveyor system has at least one main conveyor section and a plurality of secondary conveyor sections, the main conveyor section being configured for the transfer of workpieces between a honing installation transfer station and a secondary conveyor sections, and a secondary conveyor section being configured for the transfer of workpieces between the main conveyor section and at least one of the work stations,
wherein the secondary conveyor sections are designed as transverse conveyors which, starting from a main conveyor section or several main conveyor sections, serve work stations located on either side of the main conveyor section a control device for controlling the honing installation and for directing the workpieces to an available work station depending on the working step to be carried out on that workpiece.

37. Honing installation according to claim 36, wherein each of the work stations is directly connected to a secondary conveyor section of the conveyor system.

38. Honing installation according to claim 36, wherein the conveyor system has at least two parallel operable main conveyor sections and a plurality of secondary conveyor sections, each secondary conveyor section being configured for the transfer of workpieces between each of the main conveyor sections and at least one work station.

39. Honing installation according to claim 36, wherein in each case exactly two work stations configured for the same working step are associated with a secondary conveyor section.

40. Honing installation according to claim 36, wherein each of the work stations is designed as a work centre, a work centre comprising a transfer unit and a working unit, wherein the transfer unit is constructed as a circular table rotatable about a vertical rotation axis for directly transferring workpieces between the conveyor system and the working unit.

* * * * *